United States Patent [19]

Tan et al.

[11] Patent Number: 4,485,401
[45] Date of Patent: Nov. 27, 1984

[54] TELEVISION SYSTEM FOR HIGH-DEFINITION TELEVISION AND A TELEVISION TRANSMITTER AND RECEIVER SUITABLE THEREFORE

[75] Inventors: Sing L. Tan; Leendert J. van de Polder, both of Eindhoven; Theodoor M. M. Kremers, Valkenswaard, all of Netherlands

[73] Assignee: U.S. Philips Corporation, New York, N.Y.

[21] Appl. No.: 416,742

[22] Filed: Sep. 10, 1982

[30] Foreign Application Priority Data

Oct. 1, 1981 [NL] Netherlands ................. 8104476

[51] Int. Cl.³ .................. H04N 5/48; H04N 5/38
[52] U.S. Cl. ........................... 358/141; 358/12; 358/188
[58] Field of Search ............ 358/12, 133, 138, 83, 358/140, 141, 186, 188

[56] References Cited

U.S. PATENT DOCUMENTS

| | | | |
|---|---|---|---|
| 4,107,736 | 8/1978 | Lowry | 358/36 |
| 4,168,509 | 9/1979 | Hartmann | 358/138 |
| 4,210,927 | 7/1980 | Yumde | 358/12 |
| 4,310,850 | 1/1982 | Casler | 358/107 |
| 4,322,750 | 3/1982 | Lord | 358/140 |

FOREIGN PATENT DOCUMENTS 785833 11/1957 United Kingdom .

OTHER PUBLICATIONS

High Definition Television System-Signal Standard and Transmission, Fujio, SMPTE Journal, vol. 89, Aug. 1980, pp. 579-584.
Standards Conversion of a TV Signal with 625 Lines into Videophone Signal with 313 Lines Van Buul, Philips Res. Repts. 28, 377-390, 1973.
Hayashi, Research and Developement on High Definition Television in Japan, SMPTE Journal, Mar. 1981, pp. 178-186.

Primary Examiner—Michael A. Masinick
Attorney, Agent, or Firm—Thomas A. Briody; William J. Streeter; Edward W. Goodman

[57] ABSTRACT

A compatible television system for high-definition and for standardized low-definition television. In a transmitter (1) in the system, a high-definition video signal (VS1) is generated which is split into a contour signal (HVC2) which on display shows details in the horizontal and vertical directions, and a low-definition video signal (VS6). The low-definition video signal (VS6) is converted into a low-definition video signal ($\overline{VS7}$) in conformity with the standard. The contour signal (HVC2) is also converted, but is transmitted periodically over several picture periods ($\overline{HVC3}$). Both these converted signals are transmitted or stored, respectively, in two separate signal channels (3,4), each suitable for standard low-definition television. In a receiver (2) the standard video signal ($\overline{VS7}$) can be utilized directly for low-definition display by a standard display device (8). In addition, a receiver (2) comprises a high-definition display device (7) in which the converted signals are reconverted and, after having been combined (48) result in a high definition video signal suitable for high-definition display by a picture display apparatus (49). As high-definition in the region of movement in the picture may disturb the picture quality, the contour signal may be locally suppressed on display.

9 Claims, 3 Drawing Figures

TELEVISION SYSTEM FOR HIGH-DEFINITION TELEVISION AND A TELEVISION TRANSMITTER AND RECEIVER SUITABLE THEREFORE

BACKGROUND OF THE INVENTION

The invention relates to a television system for high-definition television, the system comprising a transmitter incorporating a television pick-up arrangement for generating a high-definition video signal, a first and a second signal channel coupled to the pick-up arrangement and suitable for transmission or storage, respectively of signal components of the high-definition video signal, the system also comprising a receiver incorporating at least one picture display device for high-definition display coupled to the two signal channels, the high-definition video signal generated in the transmitter and display in the receiver incorporating television line rasters containing of the order of a thousand lines and a highest video signal frequency of more than 10 MHz, and to a television transmitter and receiver suitable therefore.

Such a television system is described in the periodical "SMPTE Journal", August 1980, pages 579 to 584, inclusive. For the high-definition television system a line raster (field frequency 60 Hz) is mentioned there, having 1125 lines per single interlaced picture, while for the highest video signal frequency 20 MHz is mentioned. This results in a higher picture quality on display than in low-definition systems laid down in television standards, wherein 525 lines (or 625 lines at a field frequency of 50 Hz) per interlaced picture and a maximum video signal frequency of approximately 5 MHz are used.

In the described system which is suitable for use in color television, the high-definition video signal is split into two signal components which correspond to a luminance signal and a color signal, these signals being transmitted separately through the two signal channels. The use of separate FM-channels is mentioned for the signal channels.

The described, experimental high-definition television system is not compatible with one of the low-definition television systems laid down in the standards, which may be considered a disadvantage.

OBJECTS OF THE INVENTION

The invention has for its object to provide a high-definition television system which is indeed compatible with the low-definition systems laid down in the standards. A system according to the invention is characterized in that in the high-definition television system, which is further suitable for connection to at least one picture display device suitable for standardized low-definition television transmission, an output of the pick-up arrangement carrying the high-definition video signal is coupled to an input terminal of a signal splitter circuit having a first and a second output terminal for supplying a low-definition video signal and a contour signal, respectively, which contour signal, on display, shows details in the horizontal and vertical directions, the low-definition video signal and the contour signal together comprising in essence the information of the high-definition video signal, the first and the second output terminal, respectively of the signal splitter circuit being coupled to an input of a first and a second signal converter circuit, respectively, the first signal converter circuit having an output for supplying a standardized, interlaced video signal of a low definition which occurs picture-periodically and the second signal converter circuit having an output for supplying a contour signal which occurs periodically over several picture periods, the output of the first and the second signal converter circuits, respectively, being coupled to the first and the second signal channels, respectively, provided in the system for high-definition television; and in the receiver, the picture display device suitable for the high-definition television and the standardized low-definition television, respectively, having a first and a second input, or a single input, respectively, for connection to the respective first and second signal channels or only to the first signal channel which forms part of the standardized low-definition television system, the first and second inputs of the high-definition picture display device being coupled to a high-definition picture display apparatus via a third and a fourth signal converter circuit, respectively.

The invention is based on the recognition that it is possible to obtain compatible high-definition and low-definition television when, starting from a high-definition video signal, a standardized low-definition video signal derived therefrom and a contour signal are transmitted separately via separate signal channels which are combined on display in high-definition television and are not combined on display in the low-definition-television. Instead of transmitting the signals, thoughts may go instead towards storage in separate signal channels of a memory device. Disregarding the use of signal transmission or signal storage, it holds that the two signal channels are only suitable for low-definition television because of their limited bandwidths. The specific choice of the signal components which are to be transmitted or stored separatedly with the limited low-definition bandwidth, results in compatability.

A simple splitting of information is realized in a television system which is characterized in that the signal splitter circuit comprises a low-pass filter and a complementary high-pass filter, respectively, coupled to the input terminal, the low-pass filter being followed by a matrix circuit for forming matrixed video signals and a first contour signal, the high-pass filter being followed by a mixer circuit for stepping down the frequency of the filter output signal which is a second contour signal, outputs of the matrix circuit carrying matrixed video signals being coupled to the first output terminal via a first change-over switch and an output of the matrix circuit carrying the first contour signal and an output of the mixer circuit carrying the second contour signal being connected to the second output terminal of the signal splitter circuit via a second change-over switch.

A contour signal having horizontal and vertical details on display, is obtained in a television system which is characterized in that the low-pass filter is followed by a signal delay device having a time delay equal to one high-definition line period, the matrix circuit producing the first contour signal as a difference signal of the delayed and undelayed video signal.

The shortest cycle of the contour signal transmission, which occurs periodically over several picture periods is realized in a television system which is characterized in that the second change-over switch has a switching cycle equal to three picture periods, in one picture period the matrix circuit and during two picture periods the mixer circuit being connectable to the second output terminal of the signal splitter circuit.

A simple synchronization of a signal mixing operation in the transmitter and in the receiver is obtained in a television system which is characterized in that an input of the mixer circuit is coupled to an output of a signal generator for producing a mixing signal for stepping down the frequency, a further output of the generator, for supplying a synchronizing signal in the form of a burst of the frequency-divided mixing signal, being coupled to the second signal channel.

In order to obtain simple signal conversions by means of the converter circuits, a television system in accordance with the invention is characterized in that in the transmitter, the television pick-up arrangement is suitable for high-definition video signal generation by means of a television line raster having for each single interlaced picture a number of lines which is approximately twice the number of lines laid down in the standard, the picture being equal to the standard picture period and the line period being approximately half the standard line period.

In order to realize that the high-definition video signal is only present where it results in an improved picture quality without, depending on the content of a scene, disturbances in the picture being introduced, a television system in accordance with the invention is characterized in that the system is provided with a movement detection circuit for detecting movement in a scene recorded by the pick-up arrangement, the movement detection circuit having an input for receiving a video signal and an output for releasing a switching signal on detection of no movement/movement and movement/no movement, respectively, the output being connected to a switch for passing the contour signal when no movement is detected and for blocking the contour signal when movement is detected.

A television system comprising an adapted receiver, is characterized in that in the receiver, the second input of the picture display device for the high-definition television therein is coupled to a delay device for applying a contour signal which is delayed by one or several picture periods, to a signal combining circuit which is further coupled, by means of its input, to the first and second inputs of the picture display device and by means of outputs is coupled to the third and fourth signal converter circuits.

A television system comprising a still further adapted receiver, is characterized in that the signal combining circuit comprises change-over switches coupled to the delay device for simultaneously obtaining the contour signal which is received periodically over several picture periods, a switchable matrix circuit coupled, by means of inputs, to one of the said change-over switches and to the first input of the picture display device and signal adder circuits coupled to the other said change-over switches and to the outputs of the switchable matrix circuit.

DESCRIPTION OF THE DRAWINGS

The invention will now be described in detail, by way of example of a television system in accordance with the invention, with reference to the accompanying Figures, wherein.

DESCRIPTION OF THE PREFERRED EMBODIMENT

Figure 1:
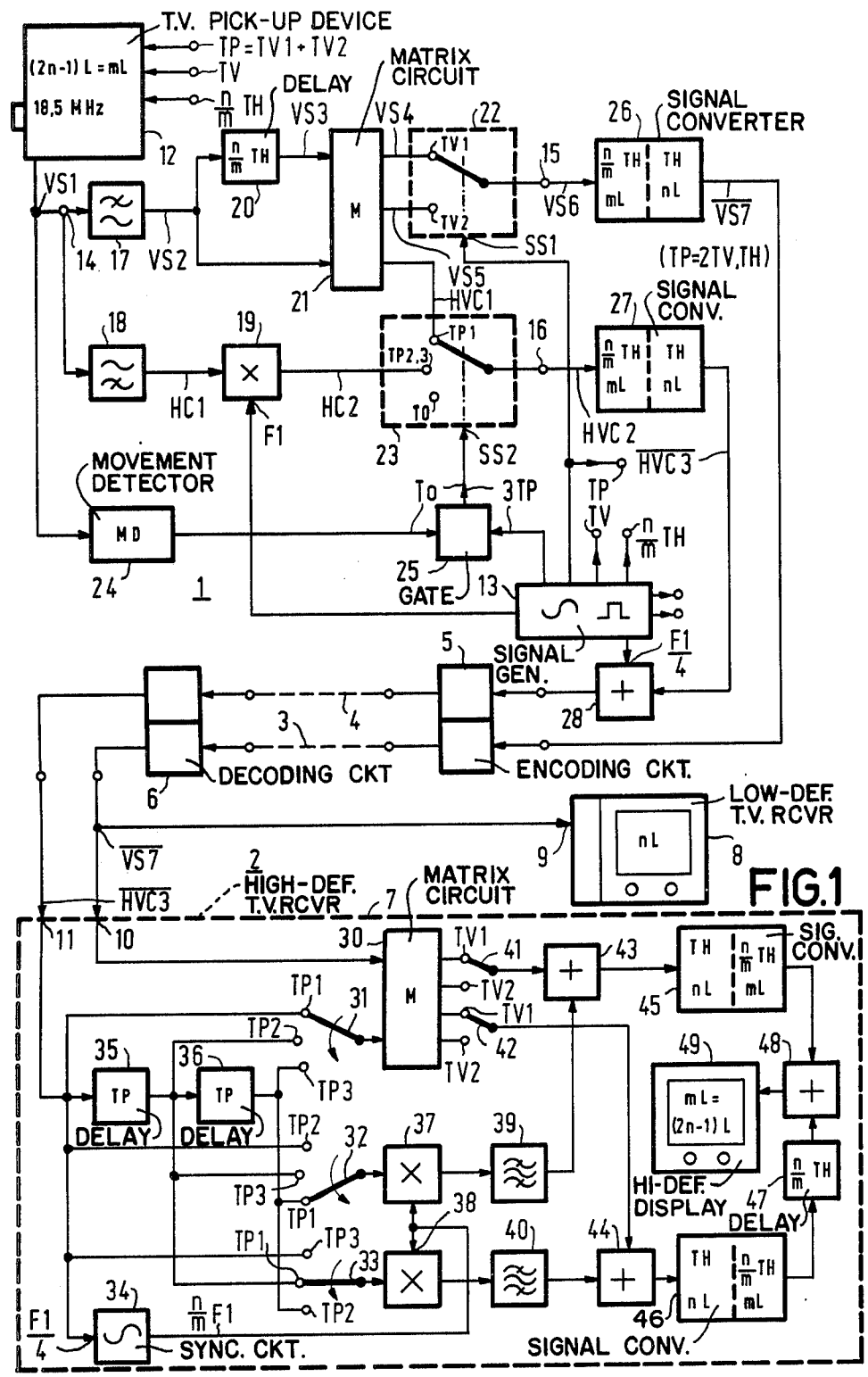
FIG. 1 is a block schematic circuit diagram of an embodiment of a television system in accordance with the invention.

FIG. 1 is a block schematic circuit diagram of a television system for high-definition television in accordance with the invention, reference numeral 1 denoting a transmitter, 2 one receiver out of, for example, a plurality of receivers, first and second signal channels being denoted by the respective reference numerals 3 and 4. The signal channels 3 and 4 may be transmission channels, each suitable for the transmission of signals laid down in television standards. These standards prescribe certain numbers of lines of television line rasters, picture frequencies and a highest video signal frequency. Examples mentioned are a 625 or a 525-line raster for each single interlaced picture having a picture frequency of 25 or 30 Hz, the maximum video signal frequency being approximately 5 or 4.2 MHz. In addition, the signal channels 3 and 4 may be suitable, in accordance with a television standard, for storing video signals and to that end may comprise memory devices such as a video tape or disk recording and playing device. The specific construction of the signal channels 3 and 4 is not relevant to the invention, it only being of importance that they are suitable for transmission or storage of video signals which are laid down in standards for low-definition television. The criterium is a maximum video signal bandwidth from 0 to approximately 5 MHz. In FIG. 1, transmitter 1 comprises an encoding circuit 5 and the receiver 2 a decoding circuit 6, which are coupled to the signal channels 3 and 4. These coding and decoding circuits are also not relevant to the invention. In the case of a color television system, circuits 5 and 6 may be of such a construction that they are suitable for use with the PAL, NTSC or SECAM system.

In accordance with the invention, the transmitter 1 and the receiver 2 are of such a construction that they are suitable for use in a high-definition television system which is compatible with the low-definition television systems laid down in the standards. To explain the compatibility, the drawing shows in the receiver 2 two picture display devices 7 and 8 which are suitable for display in high and low-definition television, respectively. In known manner the low-definition display device 8 has a single input 9, which is coupled to the signal channel 3 which is assumed to transmit a standardized low-definition video signal. The high-definition display device 7 has a first and a second input 10 and 11, respectively, which are connected to the respective signal channels 3 and 4. In accordance with the invention, the signal channel 4 transmits picture information which, when added to the standardized low-definition information supplied through the signal channel 3, results in a picture having a high definition on display.

Figure 2:
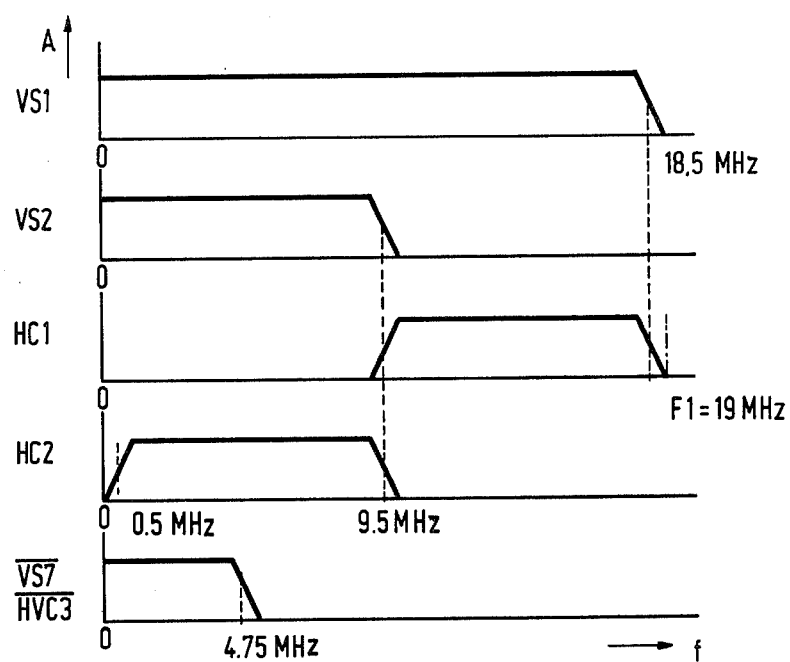
FIG. 2 shows some amplitude-frequency characteristics of specific signals to explain the operation of the system shown in FIG. 1.

To generate a high-definition video signal, the transmitter 1 comprises a television pick-up device 12. In the device 12 information coming from a scene, not shown, is converted into a potential image which is further converted line and field-sequentially into a video signal by means of a television line raster interlaced singly (2:1) for each picture, the line scan being effected in the horizontal direction and the field scan in the vertical direction. The device may incorporate one or several television pick-up devices such as pick-up tubes or solid state pick-up devices and may be suitable for black-white television and color television, respectively. The only fact of importance to the invention is that the pick-up device 12 must be suitable to produce a high-definition video signal which, for that purpose, has a highest frequency higher than 10 MHz, for example 18.5 MHz. Such a signal having a bandwidth from 0 to 18.5 MHz may be obtained by means of a television line raster having a number of lines (mL) per single interlaced picture which is approximately twice the number of lines (nL) laid down in the low-definition television standard, the picture period being equal to the standard picture period and the line period being approximately half the standard line period. For the 2:1 interlaced 625-line standard (n=625), the picture period (TP) being equal to 40 ms and the line period (TH) being equal to 64 $\mu$s, a 2:1 interlaced 1249-line raster (m=2n−1) is chosen, for example, in the pick-up device 12 for the compatible high-definition system, the line period being equal to 32.03 $\mu$s ((n/m)TH). For the 2:1 interlaced 525 line standard, the picture period being equal to 33.366 ms and the line period being equal to 63.556 $\mu$s, a 2:1 interlaced 1049-line raster is, for example, chosen in the pick-up device 12, the high-definition line period being equal to 31.81 $\mu$s. Independent of the specific construction of the pick-up device 12, let it be assumed that this device supplies a high-definition video signal VS1 which, in accordance with FIG. 1, has a highest video signal frequency equal to 18.5 MHz and is obtained by means of a line raster having a number of lines equal to (2n−1)L=ML. The choice of the factor (2n−1) and the same picture period as in the standard furnishes the advantage of a signal conversion, still be described, as described inter alia in the U.S. Pat. No. 3,830,971 and which can be performed in a simple manner. Thoughts may further go to the factors (2n+1), (2n±3), (2n±5) etc., which at larger deviations require a less simple signal conversion. FIG. 2 shows the signal amplitude (A)-frequency (f) characteristic of the high-definition video signal VS1 and also of signals still to be described. At the pick-up device 12 of FIG. 1, some signal inputs are shown for receiving control signals which occur with the picture period TP=TV1+TV2, the field period TV and the line period (n/m)TH. These signals and further signals still to be described, or not described, are supplied by, for example, a signal generator 13 which is capable of producing sinusoidal and pulse-shaped signals and is, for example, synchronized by signals received, not shown.

The high-definition video signal VS1 is applied to an input terminal 14 of a signal splitter circuit, still to be described, which has a first output terminal 15 and a second output terminal 16. The input terminal 14 is connected to an input of a low-pass filter 17 and to the input of a complementary high-pass filter 18. The outputs of the filters 17 and 18, respectively, carry signals VS2 and HC1, respectively, whose amplitude-frequency-characteristics are shown in FIG. 2. Up to a frequency of 9.5 MHz, the signals VS2 contains the low-frequency signal component of the high definition video signal VS1 and is consequently a frequency-limited low-definition video signal. From 9.5 to 18.5 MHz, the signal HC1 contains the high-frequency signal component of the high-definition video signal VS1 and consequently is a contour signal which on display would show the details in the direction of line scan, that is to say in the horizontal direction. The output of the high-pass filter 18 carrying the high-frequency contour signal HC1 (9.5 to 18.5 MHz) is connected to an input of a mixer circuit 19, to a further input of which a mixing signal having a frequency equal to F1=19 MHz is applied from generator 13. The mixer circuit 19 incorporates a low-pass filter, not shown, as a result of which only signals having the difference frequencies between the frequency F1 and the frequencies in the signal HC1, become available at the output thereof. This results in a signal HC2 at the output of the circuit 19 which has a frequency band between 0.5 and 9.5 MHz. As a result thereof, the signal HC2 is a contour signal whose frequency is stepped down.

Figure 3:
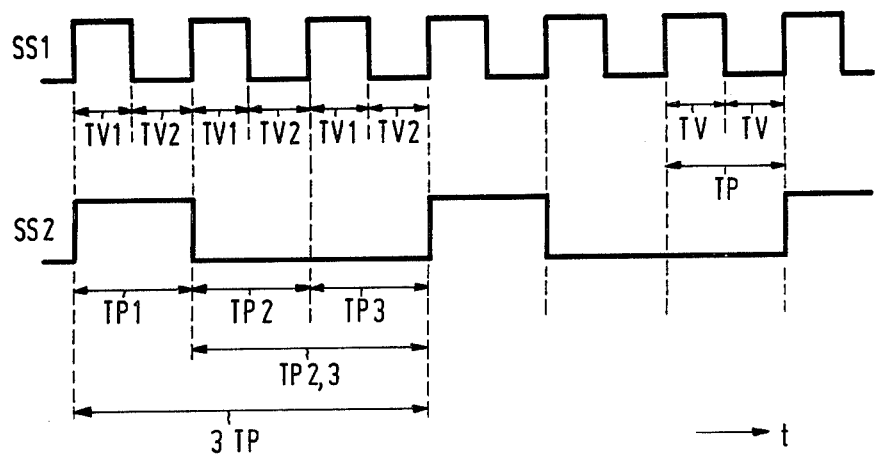
FIG. 3 shows, for the same purpose, the signal variations of some signals as a function of the time.

The output of the low-pass filter 17 carrying the low-definition video signal VS2 is connected directly and via a delay device 20, having a signal time delay equal to (n/m)TH, to inputs of a matrix circuit (M)21. The output of the device 20 carries a video signal VS3 which is delayed by one line period with respect to the video signal VS2. The matrix circuit 21 has three outputs at which signals VS4, VS5 and HVC1 become available. The matrixed video signals VS4 and VS5, respectively, are applied to change-over contacts TV1 and TV2, respectively, of a change-over switch 22, which has a master contact connected to the output terminal 15. For simplicity, the change-over switch 22 is shown in the drawing as a mechanical switch, but in practice it is in the form of an electronic switch, which also applies to further change-over switches still further to be described. The change-over switch 22 has a switching signal input to which a switching signal SS1 is applied from generator 13. The signal HVC1 is applied to a change-over contact TP1 of a change-over switch 23 which has a master contact connected to the output terminal 16. In addition, the change-over switch 23 has a change-over contact TP2,3, to which the signal HC2 from the mixer circuit 19 is applied and has also a free change-over contact To. The change-over switch 23 has a switching signal input to which a switching signal SS2 is applied. In FIG. 3 the signal variations of the switching signals SS1 and SS2 are plotted versus the time t. During the time periods indicated in FIG. 3, the switches 22 and 23 have connected to the master contact the change-over contacts which are denoted in the same way. Under the control of the switching signal SS1, the change-over switch 22 has a switching cycle which has a duration of one picture period TP=2TV. Under the control of the switching signal SS2, the change-over switch 23 has a switching cycle between the contacts TP1 and TP3, which has a duration of three picture periods TP. For the free contact To, it holds that, when it is connected to the master contact the change-over switch 23 operates as a circuit breaker, which may be desirable when there is local movement in the scene recorded by the pick-up device 12. In order to detect whether there is movement or no movement in the scene, the output of the pick-up device 12 is connected to the input of a movement detection circuit (MD) 24. The output of the circuit 24 and an output of the generator 13 are connected to the switching signal input of the switch 23 via a gate circuit 25. If no movement is detected generator 13 applies, with a period 3TP, the signal SS2 shown in FIG. 3 to the switch 23. If movement is detected during a period of time To, the switch 23 is switched off. For an embodiment of the movement detection circuit 24, reference is made to the U.S. Pat. No. 4,107,736.

In the transmitter of FIG. 1, a signal splitting circuit (14–23) is present in the manner described in the foregoing, wherein the signal VS1 is applied to the input terminal 14 and the output terminals 15 and 16, respectively, carry signals VS6 and HVC2, respectively. The signal VS6 comprises, periodically for each picture period TP, the signal VS4 during the first field period TV1 and the signal VS5 during the second field period TV2, so that it holds that VS6(TP)=VS4(TV1)+VS5(TV2). The signal VS6 is produced by a switchable matrix circuit (21, 22). The signal HVC2 comprises, periodically over three picture periods TP, the signal HVC1 as a first contour signal over a first picture period TP1 and the signal HC2 as the second contour signal over the subsequent two picture periods TP2,3, so that for the composite contour signal HVC2 it holds that HVC2(3TP)=HVC1 (TP1)+HC2 (TP2,3).

The signal splitting operation is performed as follows. In the matrix circuit 21 the output signals are formed as follows:

$$VS4 = \tfrac{1}{4}VS3 + \tfrac{3}{4}VS2,$$

$$VS5 = \tfrac{3}{4}VS3 + \tfrac{1}{4}VS2,$$

$$HVC1 = VS3 - VS2.$$

In the case in which in the pick-up device 12 a (2n−1)L=mL=1249L line raster, interlaced per picture period TP=TV1+TV2, is used, the lines L being sequentially numbered L1, L2 etc., to L1249, the following line sequence is obtained: for the first field period TV1: L1, L3, L5, ... L1249 and for the second field period TV2: L2, L4, L6, ... L1248.

Expressed in lines, there follows for the relevant matrixed video signals VS4 and VS5 released by the matrix circuit 21:

VS4(TV1): $\tfrac{1}{4}$L1+$\tfrac{3}{4}$L3, $\tfrac{1}{4}$L3+$\tfrac{3}{4}$L5, $\tfrac{1}{4}$L5+$\tfrac{3}{4}$L7, ...

VS5(TV2): $\tfrac{3}{4}$L2+$\tfrac{1}{4}$L4, $\tfrac{3}{4}$L4+$\tfrac{1}{4}$L6, $\tfrac{3}{4}$L6+$\tfrac{1}{4}$L8, ...

which in each picture period TP results in the signal VS6=VS4 (TV1)+VS5 (TV2). For the relevant contour signal HVC1 (TP1)=HVC1 (TV1)+HVC1 (TV2), it follows once in every three picture periods TP that:

HVC1(TV1): L1−L3, L3−L5, L5−L7, ...

HVC1(TV2): L2−L4, L4−L6, L6−L8, ...

Herein, the signal HVC1 is a contour signal which on display gives details in the horizontal (H) and tical (V) directions. Picture sequentially, the signal HVC1 is combined with the stepped down contour signal HC2 (which on display gives details in the horizontal direction) so that the composite contour signal HVC2 is obtained.

For the signals VS6 and HVC2, it holds that they have a bandwidth from 0 to 9.5 MHz, so that without further measures, no transmission over or storage in the signal channels 3 and 4 is possible since they have a more limited bandwidth up to approximately 5 MHz. To enable a bandwidth limitation of the signals VS6 and HVC2, these signals are applied to respective signal converter circuits 26 and 27. In the circuits 26 and 27, the information belonging to a mL=1249L line raster having a line period (n/m)TH=32.03 μs is converted into information belonging to a nL=625L line raster having a line period TH=64 μs, the bandwidth being reduced to approximately half its width. This results in the signal converting circuit 26 supplying a standardized video signal $\overline{VS7}$. For the interlaced, periodically occurring video signal $\overline{VS7}$ (TP=2TV, TH), it holds that:

$$\overline{VS7}(TV1): \tfrac{1}{4}L1+\tfrac{3}{4}L3, \tfrac{1}{4}L5+\tfrac{3}{4}L7, \tfrac{1}{4}L9+\tfrac{3}{4}L11, \ldots \quad (1)$$

$$\overline{VS7}(TV2): \tfrac{3}{4}L2+\tfrac{1}{4}L4, \tfrac{3}{4}L6+\tfrac{1}{4}L8, \tfrac{3}{4}L10+\tfrac{1}{4}L12, \ldots \quad (2)$$

The signal converter circuit 27 then produces a converted signal $\overline{HVC3}$ containing only contour information, more specifically periodically over three picture periods TP, it holding that $\overline{HVC3}$ (3TP)=$\overline{HVC1}$ (TP1)+$\overline{HC2}$ (TP2,3).

During the three picture periods it holds that

TP1: $\overline{HVC1}$(TV1): L1−L3, L5−L7, L9−L11, ...   (3)

$\overline{HVC1}$(TV2): L2−L4, L6−L8, L10−L12, ...   (4)

TP2: $\overline{HC2}$(TV1): L1, L5, L9, ...   (5)

$\overline{HC2}$(TV2): L2, L6, L10, ...   (6)

TP3: $\overline{HC2}$(TV1): L3, L7, L11, ...   (7)

$\overline{HC2}$(TV2): L4, L8, L12, ...   (8)

In FIG. 2, the amplitude-frequency characteristics of the signals $\overline{VS7}$ and $\overline{HVC3}$ are shown with a frequency band from 0 to 4.75 MHz, so that the signals are suitable for transmission over the signal channels 3 and 4 with a standard bandwidth up to approximately 5 MHz.

For possible constructions of the first and second signal converter circuits 26 and 27 reference is made to the United Kingdom Patent Specification No. 785,833 and for more contemporary constructions reference is made to the U.S. Pat. No. 3,830,971 and Philips Research Reports 28, pages 377–390, 1973. In the construction in accordance with the United Kingdom Patent Specification the converter circuit is provided with display and pick-up equipment, the display being carried out adapted to the line raster at the pick-up device 12 and picture pick-up being carried out in accordance with the instructions laid down in the standard. In the more contemporary constructions, the converter circuits are provided with a plurality of storage devices which, with mutual variation, are written into and read out of with different speeds. In the simplest implementation, two storage devices are alternately and fast written via a change-over switch and thereafter read at half the speed, whereafter the output signals are added together. Thus, a sequence:

L1, L3, L5, L7, L9, ... L2, L4, L6, L8, L10, ...

(line period TH/2) is converted into

L1, L5, ..., L2, 6, ...

(line period TH).

Reconversion can be effected in a similar manner.

The standardized video signal VS7 is applied without further measures to the coding circuit 5 for conveyance to the signal channel 3. In an adder circuit 28 a burst of a synchronizing signal having a frequency equal to L1/4 is added to the contour signal $\overline{HVC3}$, whereafter it is applied to the encoding circuit 5. The synchronizing signal having the frequency F1/4 is received from the generator 13, which applies the mixing signal having the frequency F1=19 MHz to the mixer circuit 19. In this situation, the synchronizing signal has obtained, by means of frequency division, the frequency F1/4=4.75 MHz, and is therefore suitable for transmission over the signal channel 4 with a bandwidth up to approximately 5 MHz. The burst of the synchronizing signal is transmitted, for example line periodically, on the back porch in the television line blanking period, for example, in the manner the color sub carrier burst is transmitted in color television systems (in signal channel 3). It will appear that the burst is intended for synchronous mixing in the receiver 2, with the proper frequency and in the proper phase.

In the receiver 2, the decoding circuit 6 produces the standardized low-definition video signal $\overline{VS7}$ described with reference to transmitter 1, and the contour signal $\overline{HVC3}$, which occurs periodically over three picture periods. Without any further measure, the low-definition picture display device 8 displays the signal $\overline{VS7}$ by means of a standardized nL=625L line raster, approximately 50 line periods of which occur in the field blanking interval. Via the input 10 of the picture display device 7, the signal $\overline{VS7}$ is applied to an input of a matrix circuit (M) 30. The input 11, to which the signal $\overline{HVC3}$ is applied, is connected in the device 7 to a change-over contact TP1 of a change-over switch 31, a change-over contact TP2 of a change-over switch 32, a change-over contact TP3 of a change-over switch 33, an input of a synchronizing circuit 34 and an input of a signal delay device 35. Arranged in series with the device 35 is a second signal delay device 36, these two devices each having a time delay equal to one picture period TP. The devices 35 and 36 together form a delay device (35, 36) for releasing a contour signal $\overline{HVC3}$ delayed by one and by two picture periods TP. The output of the device 35 is connected to change-over contacts TP2, TP3 and TP1 of the respective switches 31, 32 and 33. The output of the device 36 is connected to change-over contacts TP3, TP1 and TP2 of the respective change-over switches 31, 32 and 33. The master contact of the change-over switch 31 is connected to an input of the matrix circuit 30. The master contacts of the change-over switches 32 and 33, respectively, are connected to an input each of mixer circuits 37 and 38, respectively, to further inputs of which the output of the synchronizing circuit 34 is connected. For mixing purposes, the circuit 34 applies a mixing signal having the frequency (n/m)F1=n/2n−1) F1 to the circuits 37 and 38, this signal being derived with the proper phase from the received burst of the synchronizing signal having the frequency F1/4. The circuits 37 and 38 are followed by respective bandpass filters 39 and 40. The mixer circuits 37 and 38 and the bandpass filters 39 and 40 cause the received information which corresponds to the signal HC2 (up to the frequency 4.75 MHz) to be converted into information corresponding to the signal HC2 (FIG. 2). A subsequent reconversion will then result in a displacement to the frequency band from 9.5 to 19 MHz. The factor (n/m) of the mixing frequency is required as a mixing operation is performed in the transmitter 1 prior to the signal conversion (m-line raster) and in the receiver 2 before the reconversion (n-line raster).

The matrix circuit 30 has four outputs. Two outputs are connected to change-over contacts TV1 and TV2 of change-over switches 41 and 42, respectively. The master contacts of the change-over switches 41 and 42, respectively, are connected to an input each of adder stages 43 and 44, respectively, a further input of each adder stage being connected to the outputs of the bandpass filters 39 and 40, respectively. The outputs of the adder circuits 43 and 44, respectively, are connected to inputs of signal converter circuits 45 and 46, respectively. Relative to the first and the second signal converter circuits 26 and 27, the third and fourth signal converter circuits 45 and 46 effect a reconversion, as is designated by TH, nL and (n/m)TH, mL. The output of the circuit 45 is connected directly and the output of the circuit 46 is connected via a signal delay device 47 to respective inputs of an adder circuit 48. The device 47 has a time delay equal to (n/m)TH, this being the high-definition line period. The output of the adder circuit 48 is connected to an input of a high-definition picture display apparatus 49 which operates with a mL=(2n−1)L=1249L line raster, of which, for example, 50 line periods occur in a field blanking period. For the sake of simplicity, the switching signals required for the change-over switches 31, 32, 33, 41 and 42 are not shown at the device 7. It will appear that in the described manner, the picture display device 7 for the high-definition television is provided with a signal combining circuit (30–33, 41–44) of which a switchable matrix circuit (30, 41, 42) is a part, the change-over switches 31, 32 and 33 being operative for having the contour signal $\overline{HVC3}$ which was transmitted periodically over the three picture periods TP simultaneously available.

For a better understanding of how the high-definition picture display device 7 operates the following applies.

In the matrix circuit 30 the signals applied thereto are added together in the manner opposite to the matrixing operation in the matrix circuit 21. The picture periodic video signal $\overline{VS7}$ is then combined with the contour signal $\overline{HVC1}$, which is received once in every three picture periods TP, in the picture period TP1. To that end, the change-over switch 31 is provided at the two delay devices 35 and 36. Dematrixing is effected because of the fact that the change-over switches 41 and 42 convey, during the field periods TV1 and TV2, signals which are formed in accordance with the formulae:

change-over switch 41 (TV1): $\overline{VS7}+\frac{1}{3}\overline{HVC1}$ change-over switch 42 (TV1): $\overline{VS7}-\frac{1}{3}\overline{HVC1}$ and change-over switch 41 (TV2): $\overline{VS7}+\frac{1}{3}\overline{HVC1}$ change-over switch 42 (TV2): $\overline{VS7}-\frac{2}{3}\overline{HVC1}$ From the aforementioned signal sequences (1) and (2) in combination with the signal sequences (3) and (4), the following simultaneously occurring signal sequences are obtained:

change-over switch 41: (TV1 ... TV2) L1, L5, L9 . . . L2, L6, L10 . . . .     (9)

change-over switch 42: (TV1 ... TV2) L3, L7, L11 . . . L4, L8, L12 . . . .     (10)

The respective signal sequences (5) and (6) and (7) and (8) are added to the signal sequence (9) and (10), respectively, so that at the outputs of the adder circuits 43 and 44, respectively, signals occur which contain information coming from the signals $\overline{VS7}$, $\overline{HVC1}$ and $\overline{HC2}$. The reconversion in the circuits 45 and 46, the signal delay in the device 47 and the signal addition in the circuit 48 is illustrated in the following survey:

After adder circuit 43: L1 L5 L9 .... L2 L6 L10 ..
 ..

After reconversion: L1 L5 .... L2 L6 ....

After adder circuit 44: L3 L7 11 .... L4 L8 L12 ..
 ..

After reconversion: . L3 L7 .... L4 L8 ....

After delaying: L3 L7 .... L4 L8 ....

After adding: L1 L3 L5 7 .... L2 L4 L6 L8 ....

This results in the picture display device 49 displaying a picture having a high definition.

The use of the movement detection circuit 24 and the gate circuit 25 in the transmitter 1 results in, on detection of the locally occurring movement, no contour signal being transmitted. The contour signal is then present in the receiver 2 during a further two picture periods, via the delay devices 35 and 36. Thereafter the contour signal is locally absent. After detection of the absence of movement, it takes two picture periods before the contour signal is locally restored. Instead of movement detection and contour signal blocking in the transmitter 1, it is alternatively possible to perform these operations in (each receiver)2.

What is claimed is:

1. A television system for high-definition television, the system comprising a transmitter incorporating a television pick-up arrangement for generating a high-definition video signal, a first and a second signal channel, each having a bandwidth in accordance with an existing television transmission standard, coupled to the pick-up arrangement and suitable for transmission or storage, respectively, of signal components of the high-definition video signal, the system also comprising a receiver incorporating at least one picture display device for high-definition display coupled to the two signal channels, the high-definition video signal generated in the transmitter and displayed in the receiver incorporating television line rasters containing on the order of a thousand lines and a highest video signal frequency of more than 10 MHz, characterized in that in the high-definition television system, which is further suitable for connection to at least one picture display device suitable for low-definition television transmission in accordance with said existing television standard, in the transmitter, an output of the pick-up arrangement for applying the high-definition video signal is coupled to an input terminal of a signal splitter circuit having a first and a second output terminal for supplying a low-definition video signal and a contour signal, respectively, which contour signal on display shows details in the horizontal and vertical directions, the low-definition video signal and the contour signal together comprising in essence the information of the high-definition video signal, the first and the second output terminals, respectively, of the signal splitter circuit being coupled to an input of a first and a second signal converter circuit, respectively, the first signal converter circuit having an output for supplying an interlaced video signal of a low-definition compatible with said standard and which occurs picture-periodically, and the second signal converter circuit having an output for supplying a contour signal which occurs periodically over several picture periods, the outputs of the first and the second signal converter circuit, being respectively coupled to the first and the second signal channels provided in the system for high-definition television and, in the receiver, the picture display devices suitable for the high-definition television and the standardized low-definition television, respectively, include a first and a second input and a single input, respectively, for connection to the respective first and second signal channels and to the first signal channel which forms part of the standardized low-definition television system, the first and the second inputs of the high-definition picture display device being coupled to a high-definition picture display apparatus via a third and fourth signal converter circuit, respectively.

2. A television system as claimed in claim 1, characterized in that the signal splitter circuit comprises a low-pass filter and a complementary high-pass filter, respectively coupled to the input terminal, the low-pass filter being followed by a matrix circuit for forming matrixed video signals and a first contour signal, the high-pass filter being followed by a mixer circuit for stepping down the frequency of the filter output signal which is a second contour signal, outputs of the matrix circuit carrying matrixed video signals being coupled to the first output terminal via a first change-over switch and an output of the matrix circuit carrying the first contour signal and an output of the mixer circuit carrying the second contour signal being connected to the second output terminal of the signal splitter circuit via a second change-over switch.

3. A television system as claimed in claim 2, characterized in that the low-pass filter is followed by a signal delay device having a time delay equal to one high-definition line period, the matrix circuit producing the first contour signal as a difference signal of the delayed and undelayed video signal.

4. A television system as claimed in claim 2 or claim 3, characterized in that the second change-over switch has a switching cycle equal to three picture periods, in one picture period the matrix circuit and during two picture periods the mixer circuit being connectable to the second output terminal of the signal splitter circuit.

5. A television system as claimed in claim 2 or 3, characterized in that an input of the mixer circuit is coupled to an output of a signal generator for producing a mixing signal for stepping down the frequency, a further output of the generator, for supplying a synchronizing signal in the form of a burst of the frequency-divided mixing signal, being coupled to the second signal channel.

6. A television system as claimed in claim 1 or 2, characterized in that in the transmitter, the television pick-up arrangement is suitable for high-definition video signal generation by means of a television line raster having for each single interlaced picture, a number of lines which is approximately twice the number of lines laid down in the standard, the picture period being equal to the standard picture period and the line period being approximately half the standard line period.

7. A television system as claimed in claim 1 or 2, characterized in that the system further comprises a movement detection circuit for detecting movement in a scene recorded by the pick-up arrangement, the movement detection circuit having an input for receiving a video signal and an output for releasing a switching signal on detection of no movement/movement and movement/no movement, respectively, the output being connected to a switch for passing the contour signal when no movement is detected and for blocking the contour signal when movement is detected.

8. A television system as claimed in claim 1 or 2, characterized in that in the receiver, the second input of the picture display device for the high-definition television therein, is coupled to a delay device for applying a contour signal which is delayed by at least one picture period to a signal combining circuit which is further coupled by means of its input to the first and the second input of the picture display device and by means of outputs is coupled to the third and fourth signal converter circuits.

9. A television system as claimed in claim 8, characterized in that the signal combining circuit comprises change-over switches coupled to the delay device for simultaneously obtaining the contour signal which is received periodically over several picture periods, a switchable matrix circuit coupled by means of inputs to one of said change-over switches and to the first input of the picture display device, and signal adder circuits coupled to the other of said change-over switches and the outputs of the switchable matrix circuit.

* * * * *